United States Patent
DeAngelis et al.

(10) Patent No.: US 10,416,275 B2
(45) Date of Patent: Sep. 17, 2019

(54) ADVANCED TOOLS FOR AN OBJECT TRACKING SYSTEM

(71) Applicant: Isolynx, LLC, Haverhill, MA (US)

(72) Inventors: Douglas J. DeAngelis, Ipswich, MA (US); Edward G. Evansen, West Newbury, MA (US); Gerard M. Reilly, Newton, MA (US); Brian D. Rhodes, Andover, MA (US); Joseph M. Gaudreau, Waltham, MA (US); Kirk M. Sigel, Ithaca, NY (US)

(73) Assignee: ISOLYNX, LLC, Haverhill, MA (US)

( * ) Notice: Subject to any disclaimer, the term of this patent is extended or adjusted under 35 U.S.C. 154(b) by 399 days.

(21) Appl. No.: 15/153,618

(22) Filed: May 12, 2016

(65) Prior Publication Data
US 2017/0328978 A1 Nov. 16, 2017

(51) Int. Cl.
*G01S 3/02* (2006.01)
*G01S 5/02* (2010.01)
*G01S 5/14* (2006.01)

(52) U.S. Cl.
CPC .............. *G01S 5/0294* (2013.01); *G01S 5/14* (2013.01); *G01S 5/021* (2013.01); *G01S 5/0205* (2013.01)

(58) Field of Classification Search
CPC ........ G01S 5/0294; G01S 5/14; G01S 5/0205; G01S 5/021
(Continued)

(56) References Cited

U.S. PATENT DOCUMENTS 4,890,160 A * 12/1989 Thomas ................. H04N 5/145
348/429.1
6,661,342 B2 12/2003 Hall
(Continued)

FOREIGN PATENT DOCUMENTS

WO    WO 2001/08417 A1    2/2001
WO    WO-2014/197600 A1 * 12/2014 ............... G06K 9/00
(Continued)

OTHER PUBLICATIONS

IsoLynx Real-Time Player Tracking & Game Analysis Technology (2010), available at http://web.archive.org/web/20100604012151/http://www.finishlynx.com/isolynx/.
(Continued)

*Primary Examiner* — Chuong P Nguyen
(74) *Attorney, Agent, or Firm* — Lathrop Gage LLP (57) ABSTRACT

A method and software product display errors of a tracking system that utilizes a plurality of receivers positioned around a tracking area to receive pings periodically transmitted by a tracking tag within the tracking area. For each locate received from the tracking system, a symbol indicative of the locate is plotted on a display graphically depicting the tracking area. A vector connecting each pair of chronologically consecutive symbols is plotted on the display, the vector visually indicating an error within the locates that would otherwise not be visible on the display. Another method concurrently displays predicted sensitivity for each of at least two receivers of a tracking system that locates tracking tags within a tracking area, the receivers being positioned within a surrounding area of the tracking area. A graphical representation of the surrounding area, the tracking area, and receiver sensitivities indicate the predicted receiver coverage of the tracking area.

14 Claims, 10 Drawing Sheets

(58) Field of Classification Search
USPC .................................................. 342/451, 452
See application file for complete search history.

(56) References Cited

U.S. PATENT DOCUMENTS

| | | | | |
|---|---|---|---|---|
| 6,710,713 | B1* | 3/2004 | Russo | A63B 24/0021 340/573.1 |
| 6,998,987 | B2 | 2/2006 | Lin | |
| 7,671,802 | B2* | 3/2010 | Walsh | A63B 24/0021 342/450 |
| 7,675,412 | B2* | 3/2010 | Adra | G01S 5/0294 235/375 |
| 8,786,415 | B2* | 7/2014 | Cavallaro | A63B 24/0021 340/323 R |
| 8,989,880 | B2 | 3/2015 | Wohl et al. | |
| 9,002,485 | B2 | 4/2015 | Wohl et al. | |
| 9,014,830 | B2 | 4/2015 | Wohl et al. | |
| 9,180,357 | B2 | 11/2015 | Richley | |
| 9,375,628 | B2* | 6/2016 | DeAngelis | A63B 24/0021 |
| 9,517,417 | B2 | 12/2016 | Austerlade et al. | |
| 9,531,415 | B2 | 12/2016 | Stelfox et al. | |
| 9,571,143 | B2 | 2/2017 | Richley | |
| 9,602,152 | B2 | 3/2017 | Wohl et al. | |
| 9,667,287 | B2 | 5/2017 | Richley | |
| 9,698,841 | B2 | 7/2017 | Alonso et al. | |
| 9,699,278 | B2 | 7/2017 | Richley et al. | |
| 9,715,005 | B2 | 7/2017 | Hughes et al. | |
| 9,742,450 | B2 | 8/2017 | O'Hagan et al. | |
| 9,795,830 | B2* | 10/2017 | DeAngelis | A63B 24/0021 |
| 9,950,238 | B2* | 4/2018 | DeAngelis | A63B 71/0619 |
| 9,998,859 | B2* | 6/2018 | Jalali | H04W 4/021 |
| 2002/0116147 | A1 | 8/2002 | Vock | |
| 2003/0163287 | A1 | 8/2003 | Vock | |
| 2004/0006424 | A1 | 1/2004 | Joyce | |
| 2004/0178955 | A1 | 9/2004 | Menache | |
| 2006/0152303 | A1 | 7/2006 | Liang | |
| 2006/0160488 | A1 | 7/2006 | Sueoka | |
| 2007/0126558 | A1 | 6/2007 | Donato | |
| 2008/0140233 | A1 | 6/2008 | Seacat | |
| 2009/0048039 | A1 | 2/2009 | Holthouse | |
| 2009/0231198 | A1 | 9/2009 | Walsh | |
| 2010/0127853 | A1* | 5/2010 | Hanson | G01S 5/0289 340/539.13 |
| 2010/0184563 | A1 | 7/2010 | Molyneus | |
| 2010/0283630 | A1 | 11/2010 | Alonso | |
| 2011/0205022 | A1 | 8/2011 | Cavallaro | |
| 2012/0112904 | A1* | 5/2012 | Nagy | G06Q 10/08 340/539.13 |
| 2012/0188129 | A1* | 7/2012 | Ameti | G01S 5/10 342/451 |
| 2013/0066448 | A1 | 3/2013 | Alonso | |
| 2014/0361875 | A1 | 12/2014 | O'Hagan et al. | |
| 2014/0361890 | A1 | 12/2014 | O'Hagan et al. | |
| 2014/0361906 | A1 | 12/2014 | Hughes et al. | |
| 2014/0361928 | A1* | 12/2014 | Hughes | G01S 19/48 342/463 |
| 2014/0362120 | A1 | 12/2014 | Wohl et al. | |
| 2014/0364973 | A1 | 12/2014 | O'Hagan et al. | |
| 2014/0364977 | A1 | 12/2014 | Wohl et al. | |
| 2014/0365194 | A1 | 12/2014 | O'Hagan et al. | |
| 2014/0365415 | A1 | 12/2014 | Stelfox et al. | |
| 2014/0365639 | A1 | 12/2014 | Wohl et al. | |
| 2014/0365640 | A1 | 12/2014 | Wohl et al. | |
| 2015/0149250 | A1 | 5/2015 | Fein et al. | |
| 2015/0149837 | A1 | 5/2015 | Alonso et al. | |
| 2015/0178817 | A1 | 6/2015 | Fein et al. | |
| 2015/0335952 | A1 | 11/2015 | Wohl et al. | |
| 2015/0335953 | A1 | 11/2015 | Wohl et al. | |
| 2015/0335954 | A1 | 11/2015 | Wohl et al. | |
| 2015/0378002 | A1 | 12/2015 | Hughes et al. | |
| 2016/0361595 | A1 | 12/2016 | O'Hagan et al. | |
| 2017/0043260 | A1 | 2/2017 | Austerlade et al. | |
| 2017/0056721 | A1 | 3/2017 | Stelfox et al. | |
| 2017/0161530 | A1* | 6/2017 | Turner | G06K 7/10306 |
| 2017/0173387 | A1 | 6/2017 | Wohl et al. | |
| 2017/0257127 | A1 | 9/2017 | Alonso et al. | |
| 2017/0272556 | A1 | 9/2017 | Richley et al. | |
| 2017/0317702 | A1 | 11/2017 | O'Hagan et al. | |
| 2018/0093159 | A1* | 4/2018 | DeAngelis | A63B 71/0619 |
| 2018/0133580 | A1* | 5/2018 | DeAngelis | H04W 4/027 |

FOREIGN PATENT DOCUMENTS

| | | |
|---|---|---|
| WO | WO2014/197600 A1 | 12/2014 |
| WO | WO 2014197575 | 12/2014 |
| WO | WO 2014197618 | 12/2014 |
| WO | WO 2014197623 | 12/2014 |
| WO | WO 2014197679 | 12/2014 |
| WO | WO 2016196863 | 12/2016 |

OTHER PUBLICATIONS

InMotio—Tactical, Training and Performance Management video (available at https://www.youtube.com/watch?v=dq1n7lYePJI).
Fraunhofer IIS 2010 Annual Report at 83 (available at http://www.eas.iis.fraunhofer.de/content/dam/eas/de/documents/jahresbericht/JB10_engl_low_res_tcm182-91049.pdf.
Zebra Intros Next-Gen RTLS Leveraging Ultra-Wideband Technology, RFID Journal available at http://www.rfidjournal.com/articles/view?7889.
International Search Report with Written Opinion corresponding to International Patent Application No. PCT/US2017/032224, dated Jul. 31, 2017, 15 pages.

* cited by examiner

FIG. 11 though the sporting environment such that uniform coverage of a specific region of the sports environment (e.g., a portion of a playing surface) is achieved. An initial system performance evaluation is completed by recording and manually analyzing location data determined by the object tracking system for an RF tag placed on a technician as he/she walks a predetermined path within the sports environment. The predetermined path is designed to establish receiver coverage of the sports environment by the object tracking system.

ADVANCED TOOLS FOR AN OBJECT TRACKING SYSTEM

BACKGROUND

Installation, configuration, and calibration of an RF tag based object tracking system for use in a sports environment is a labor intensive and iterative process that requires expert knowledge. Receivers are first installed around a perimeter of the sports environment and each receiver is manually aimed, by eye, at a predetermined location within the sporting environment such that uniform coverage of a specific region of the sports environment (e.g., a portion of a playing surface) is achieved. An initial system performance evaluation is completed by recording and manually analyzing location data determined by the object tracking system for an RF tag placed on a technician as he/she walks a predetermined path within the sports environment. The predetermined path is designed to establish receiver coverage of the sports environment by the object tracking system.

This recording and manual analysis process is iteratively repeated, typically using three different paths of increasing granularity. After analyzing the location data from a current path, the technician will either manually adjust one or both of pan and tilt of one or more receivers and repeat the current path, or continue the process by performing the next path.

This approach requires that the technician has a system expert's intimate knowledge of receiver characteristics and associated skill to extract information from the location data recorded for each test path. The expert knowledge required is at a very high premium and the application of the knowledge varies from technician to technician.

Thus, installation of an RF tag based object tracking system (a) requires highly specific expert knowledge, (b) is time intensive, (c) is a labor intensive incremental adjustment process, (d) may result in the RE tag based object tracking system operating at adequate but not optimal performance, and (e) result in inconsistent performance from installation to installation.

SUMMARY OF THE INVENTION

In an embodiment, an optimization method displays errors of a tracking system that utilizes a plurality of receivers positioned around a tracking area to receive pings periodically transmitted by a tracking tag within the tracking area. A plurality of locates are received in chronological order from the tracking system, each locate defining a location of the tracking tag calculated by the tracking system from one of the pings received by at least two of the receivers. For each locate, a symbol is plotted on a display graphically depicting the tracking area, the symbol being indicative of the location relative to the tracking area. A vector connecting each pair of chronologically consecutive symbols is plotted on the display, the vector visually indicating an error within the locates that would otherwise not be visible on the display.

In another embodiment, a software product includes instructions, stored on non-transitory computer-readable media, wherein the instructions, when executed by a computer, perform steps for displaying errors of a tracking system that utilizes a plurality of receivers positioned around a tracking area to receive pings periodically transmitted by a tracking tag within a tracking area. The software product includes instructions for receiving, from the tracking system, a plurality of locates in chronological order, each locate defining a location of the tracking tag calculated by the tracking system from one of the pings received by at least two of the receivers. The software product also includes instructions for plotting, for each locate, a symbol on a display graphically depicting the tracking area, the symbol being indicative of the location relative to the tracking area. The software product also includes instructions for plotting, on the display, a vector connecting each pair of chronologically consecutive symbols, the vector visually indicating an error within the locates that would otherwise not be visible on the display.

In another embodiment, a method concurrently displays predicted sensitivity for each of at least two receivers of a tracking system that locates tracking tags within a tracking area, the receivers being positioned within a surrounding area of the tracking area to receive pings transmitted from the tracking tags. A graphical representation of the surrounding area and the tracking area is generated on a display. A position of each of the two receivers relative to the tracking area, and an orientation of each of the two receivers relative to a reference direction are interactively received. Each of the at least two receivers are modeled to determine sensitivity of the receiver to the pings based upon the receiver position and the receiver orientation. A graphical representation of the sensitivity of each of the two receivers is generated on the display relative to the graphical representation of the surrounding area and the tracking area. The graphical representation of the surrounding area, the tracking area, and the receiver sensitivities indicate the predicted receiver coverage of the tracking area by the at least two receivers.

DETAILED DESCRIPTION OF THE EMBODIMENTS

PCT patent application publication WO 2014/197600, filed Dec. 11, 2014, and incorporated herein in its entirety and attached as Appendix A, illustrates tools used to configure and optimize an object tracking system. The functionality described herein enhances these tools to visualize problems in deployment of the tracking system, and to visualize the resolution of these problems.

Figure 1:
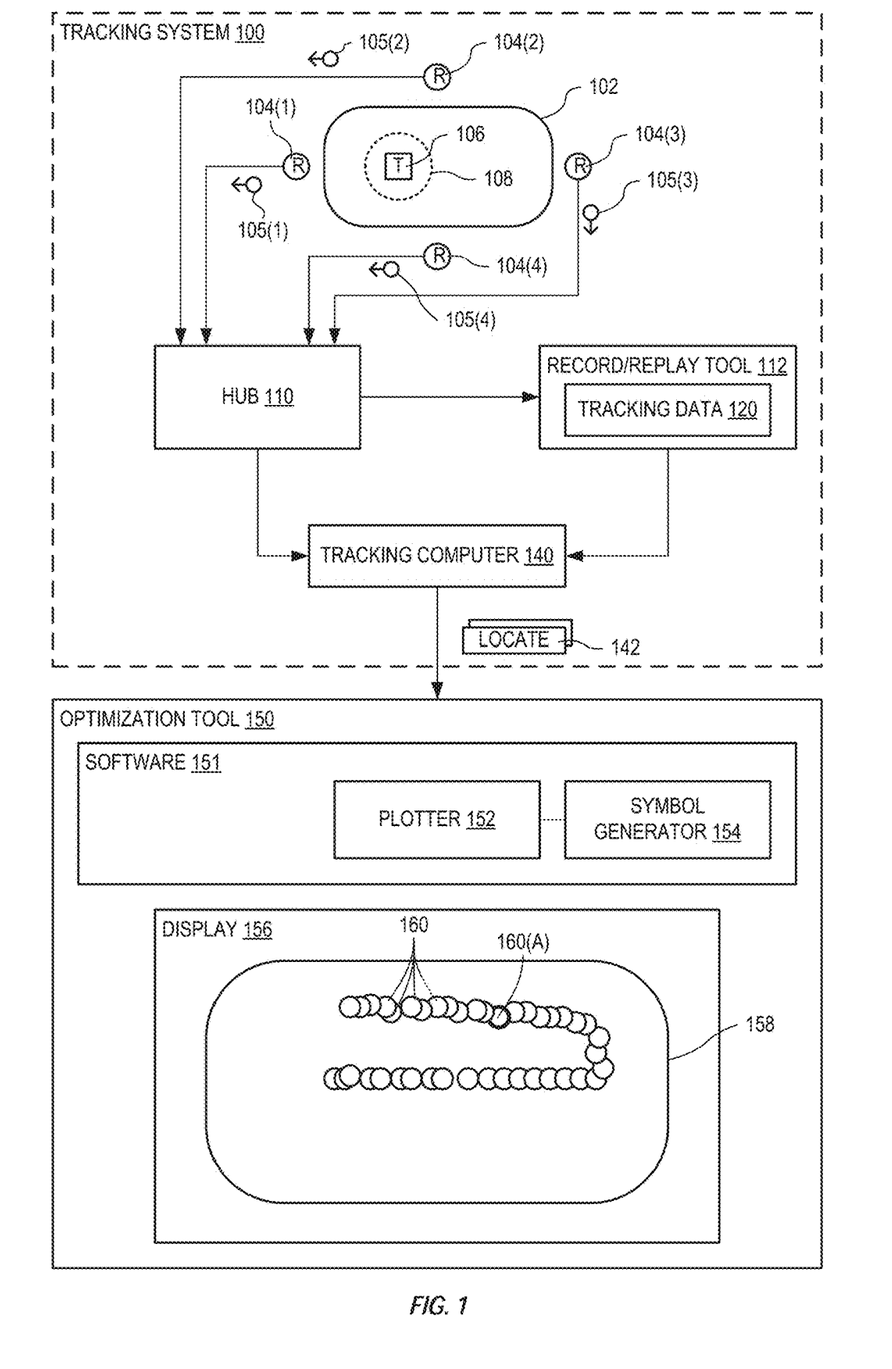
FIG. 1 shows a tracking system configured for a tracking area and an optimization tool that is used to optimize performance of tracking system, in embodiments.

FIG. 1 shows a tracking system 100 configured for a tracking area 102 (e.g., a football field for playing American football, an ice rink used for playing ice hockey, and so on) and an optimization tool 150 that is used to optimize performance of tracking system 100, in embodiments. Tracking area 102 may represent any area desired to be tracked, such as any sports field, and is not limited in scope to the football field or ice rink expressly mentioned herein. Tracking system 100 includes four receivers 104 positioned around tracking area 102 (also known as an operational area) that are each communicatively coupled with a hub 110. Within tracking area 102 a tracking tag 106 is configured to periodically transmit a wireless signal (ping) 108. As each ping 108 is received by receivers 104, receiver 104 generates a receiver event 105 that includes arrival time, data content, as well as other data, of ping 108, and sends receiver event 105 to hub 110, from where it is optionally recorded by a record/replay tool 112 as tracking data 120 and/or delivered to tracking computer 140 for immediate processing. Record/replay tool 112 may comprise a processor and associated memory storing software that, when executed by the processor, implements the recording and replay functionality of tool 112 discussed herein. Optionally, where tracking data 120 has been recorded by tool 112, tool 112 may replay all or part of tracking data 120 (i.e., receiver events 105 corresponding to certain receivers and/or a certain period) to tracking computer 140. Tool 112 may replay tracking data 120 at a desired speed, such as one of real-time (i.e., at the rate it was received), at slow speed (e.g., at a reduced rate as compared to the recording rate), and at a fast speed (e.g., at a rate faster than received). For example, tool 112 may replay receiver events 105 of tracking data 120 at a rate that matches the processing speed of tracking computer 140.

Tracking computer 140 includes a memory and a processor that executes software (machine readable instructions store in the memory) to process receiver events 105, either as received from hub 110 or as replayed by tool 112 from tracking data 120, and to generate a locate 142 for each ping 108 received by three or more receivers 104. Each locate 142 defines the determined location of tag 106 with respect to tracking area 102 at the time that the ping 108 was transmitted. Tracking computer 140 sends locates 142, as they are determined, to optimization tool 150.

It should be appreciated that the memory and processor of tracking computer 140 may be the same as, or separate from, that of record/replay tool 112, or any other device herein that includes a processor or memory. In otherwords, each processor and memory discussed herein may be the same processor and memory that stores various software instructions for implementing the functionality of the elements of the advanced tools for an object tracking system discussed herein. Alternatively, each of the elements of the tools herein may be separate elements in that they each have respective processor(s) and memory for implementing a given functionality.

Optimization tool 150 is a computer that includes a display 156, a memory, a processor, and software 151 (i.e., machine readable instructions stored in the memory and executed by the processor) to control display 156 to display a graphical representation 156 of tracking area 102 (e.g., of the ice rink) to illustrate operation of tracking system 100. Software 151 includes a plotter 152 that invokes a symbol generator 154 to display each locate 142 on display 156 in relation to representation 156.

The accuracy and quality of the determined location in each locate 142 is based upon ping 108 being detected by receivers 104, and thus accuracy and quality of each locate 142 may vary due to unpredictable environmental conditions that result in degraded reception of ping 108 by one or more receivers 104. Symbol generator 154 generates symbols 160 (illustratively shown as circles) to represent each locate 142 with respect to representation 158. Symbols 160 may also indicate other errors and information corresponding to locate 142, such as by displaying symbol 160 in an alternative color to indicate an error (e.g. too few receivers, no convergence, etc.) or missing locate. Spacing of symbols 160 on display 156 is based upon at least the periodicity of ping 108 and the movement (speed) of tag 106. Where tag 106 is moving slowly or is stationary, symbols 160 are plotted closer together.

Symbol generator 154 may determine one or more of shape, color, and size of symbol 160 based upon information within locate 142, such as one or more of accuracy, errors, or other status of locate 142. In the example of FIG. 1, symbol 160(A) is shown in heavy line to indicate a reduced accuracy (e.g., due to poor reception of ping 108, etc.) of the corresponding locate 142.

Although using different symbols to indicate certain aspects of each locate 142 provides some indication of potential problems in the configuration and operation of tracking system 100, these symbols do not visualize all issues with locates 142. For example, as shown in FIG. 1, based upon the position of symbols 160 on display 156, locates 142 appear to accurately track the movement of tag 106 within tracking area 102. However, where errors in locate 142 are large, the symbol may not be shown on display 156, and thus the error is not noticed by the viewer.

Figure 2:
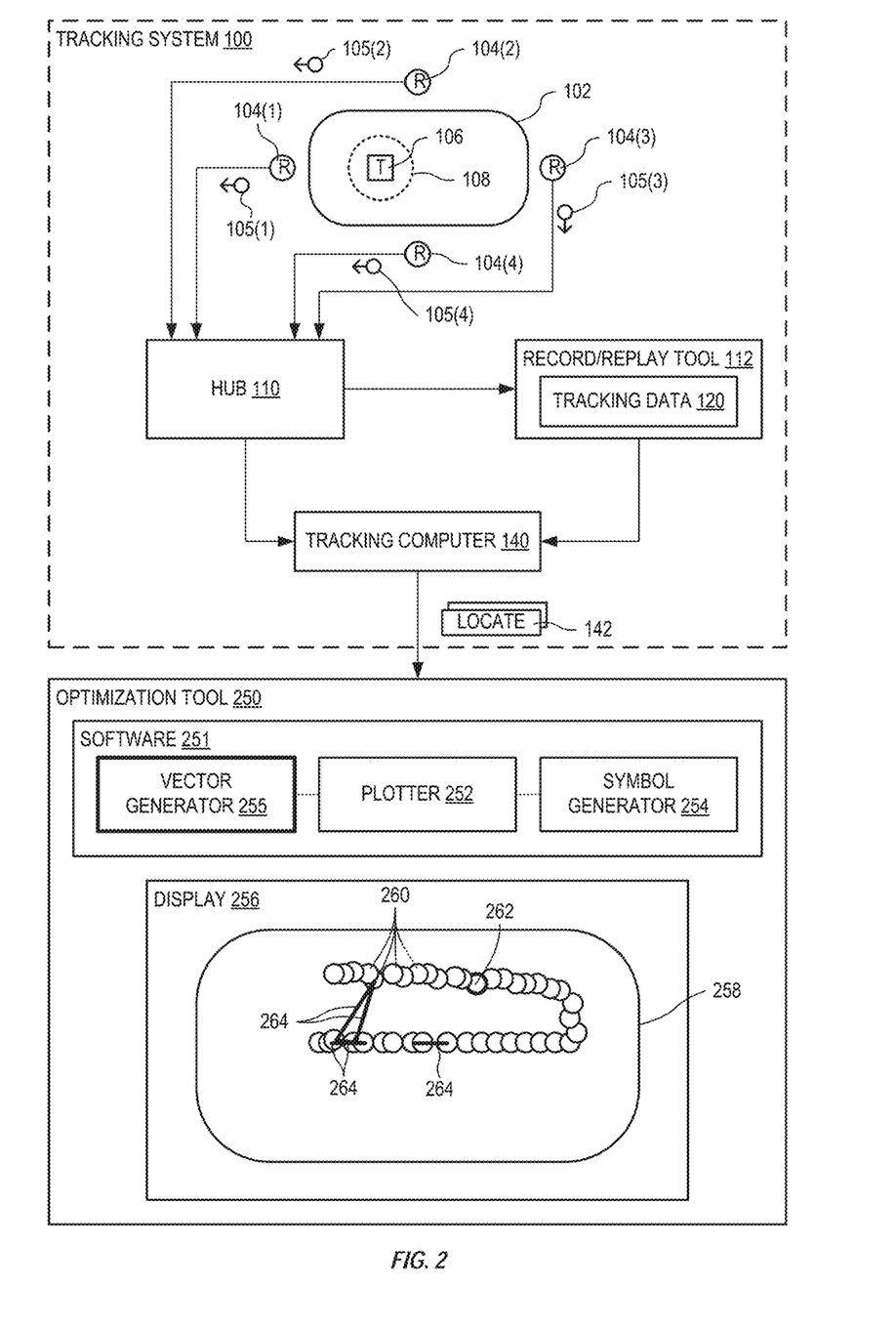
FIG. 2 shows the tracking system of FIG. 1 configured with an embodiment of an improved optimization tool that is similar to the tool of FIG. 1, including a display, software with a plotter and a symbol generator, and further includes, within software, a vector generator.
Figure 3:
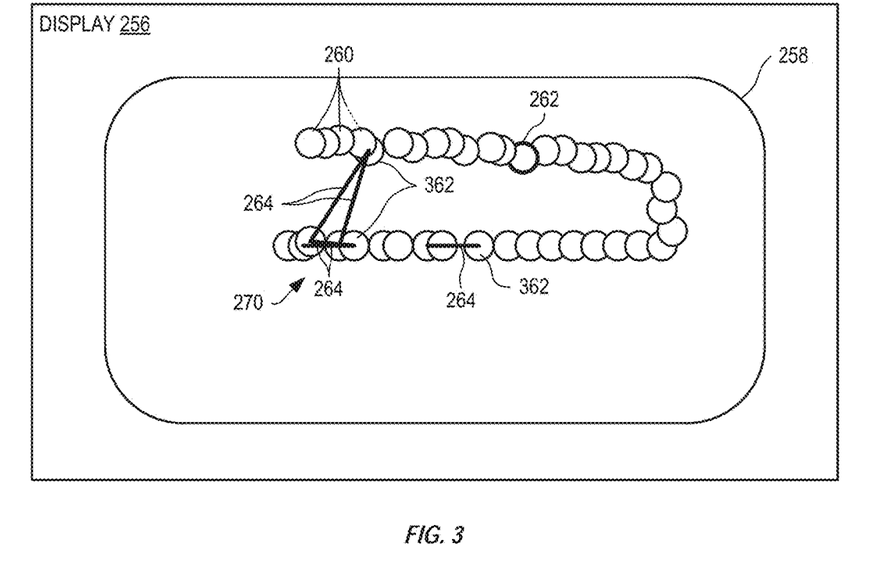
FIG. 3 shows the display of FIG. 2 in further example detail.

FIG. 2 shows tracking system 100 of FIG. 1 configured with an improved optimization tool 250 that is similar to tool 150 of FIG. 1, including a display 256, software 251 with a plotter 252 and a symbol generator 254, and further includes, within software 251, a vector generator 255. FIG. 3 shows display 256 of FIG. 2 in further example detail. FIGS. 2 and 3 are best viewed together with the following description.

Similar to tool 150, plotter 252 and symbol generator 254 cooperate to generate a graphical representation on display 256 of tracking area 102 and symbols 260, 262 corresponding to locates 142. For each pair of chronologically consecutive locates 142, vector generator 255 generates a straight line 264 between locations defined by the chronologically consecutive locates, and shows line 264 on display 256. Where the pair of chronologically consecutive locates 142 are shown as symbols 260 on display 256, the line appears to connect the symbols. Thus, where tracking system 100 optimally detects each ping 108 and correctly determines the location for each locate 142, lines 264 are short since chronologically consecutive symbols 260 are close to one another. However, where the determined location of at least one of the pair of chronologically consecutive locates 142 is erroneous, the length of line 264 is greater such that line 264 becomes more visible (and there error more obvious) to the viewer. As noted above, symbols 160 of display 156 of FIG. 1 appear to correctly track the location of tag 106. However, as shown in the enhanced display 256 of FIGS. 2 and 3, lines 264 indicate that symbol 362, and thus the location defined by the corresponding locates 142, are erroneous.

Figure 4:
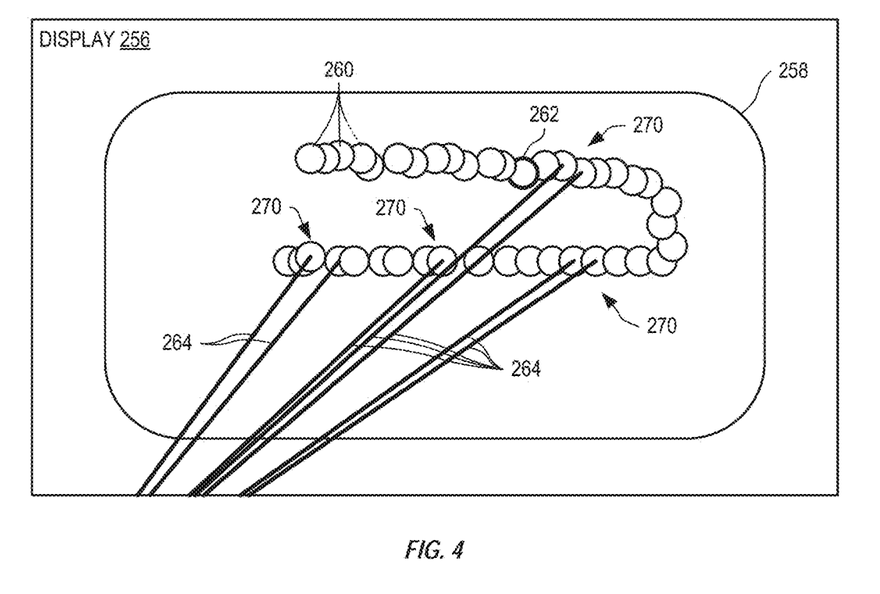
FIG. 4 shows a further example of the display of FIG. 2 illustrating lines generated by vector generator when the erroneous location of several locates cannot be shown on the display.

FIG. 4 shows a further example of display 256 showing lines 264 generated by vector generator 255 when the erroneous location of several locates 142 cannot be shown on display 256. That is, symbols 260 corresponding to these erroneous locates 142 cannot be generated by symbol generator 254 since they fall outside the area represented by display 256. However, as shown in FIG. 4, even when symbols 260 cannot be shown in display 256, at least part of lines 264 generated by vector generator 255 are visible on display 256, and the possible configuration error of tracking system 100 becomes visible to the viewer.

In the example of FIG. 4, even though symbols corresponding to the erroneous locates 142 cannot be displayed, convergence of lines 264 provide additional information to indicate the locations of these erroneous locates 142. As known in the art, certain materials reflect radio waves, resulting in the erroneous locations of some locates 142. By visually displaying lines 264 on display 256, the viewer gains valuable insight into possible causes of the error.

Figure 5:
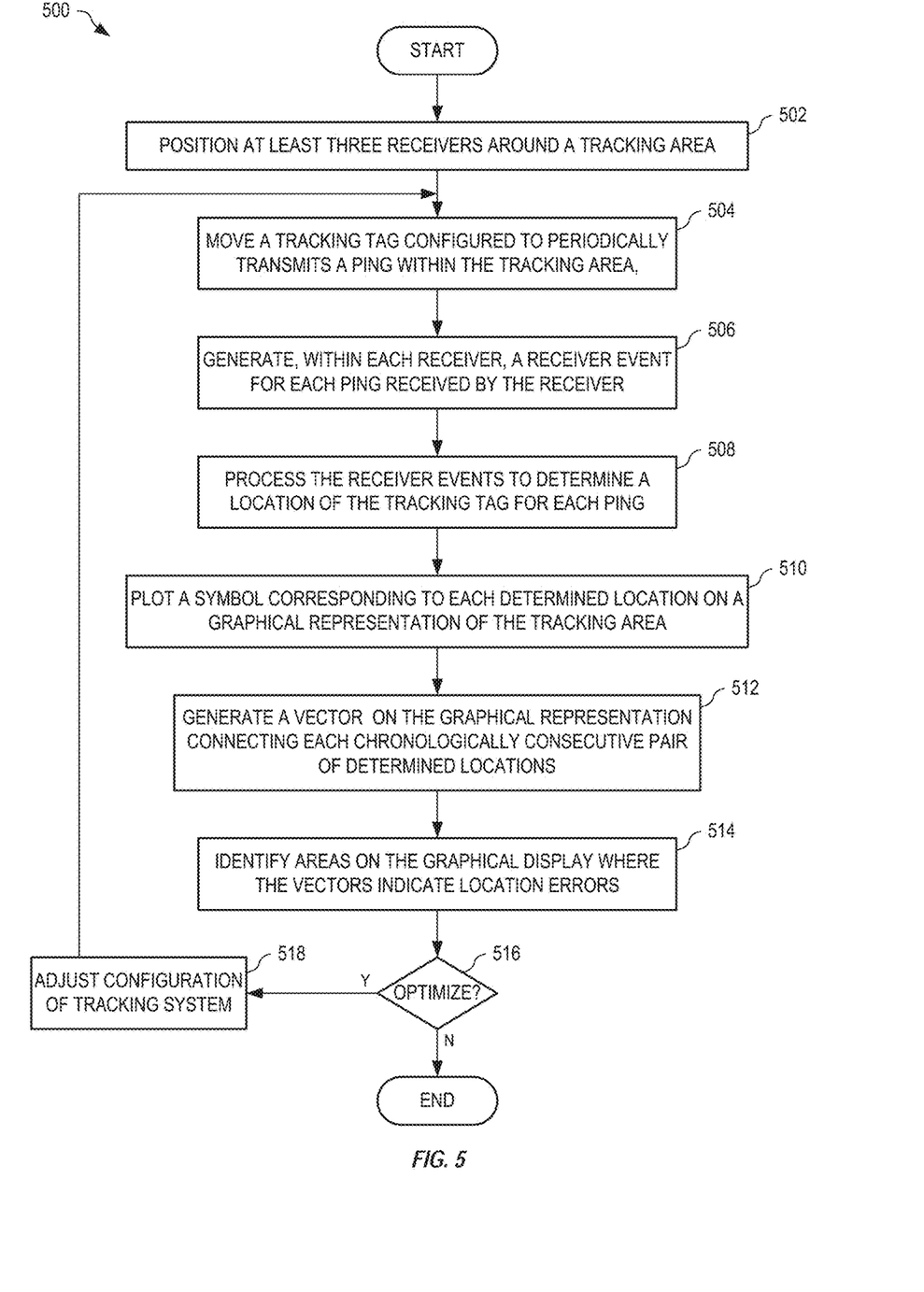
FIG. 5 is a flowchart illustrating one example method for visually evaluating and optimizing installation of tracking system of FIGS. 1 and 2.

FIG. 5 is a flowchart illustrating one example method 500 for visually evaluating and optimizing installation of tracking system 100 of FIGS. 1 and 2. At least steps 510 and 512 of method 500 are for example implemented within software 251 of optimization tool 250 of FIG. 2.

In step 502, method 500 positions at least three receivers around a tracking area. In one example of step 502, at least three receivers 104 are positioned around tracking area 102. In step 504, method 500 moves a tracking tag configured to periodically transmit a ping within the tracking area. In one example of step 504, tracking tag 106 is configured to periodically transmit ping 108 and is moved within tracking area 102 in a particular pattern. In one embodiment, tracking tag 106 is positioned on a remote controlled vehicle that is controlled by optimization tool 250 to move in a predefined pattern at a constant speed within tracking area 102. In step 506, method 500 generates, within each receiver, a receiver event for each ping received by the receiver. In one example of step 506, for each received ping 108, receivers 104 are configured to generate and send receiver event 105 to hub 110, where receiver event 105 identifies tag 106 and indicates a time of arrival of ping 108 at receiver 104.

In step 508, method 500 processes the receiver events to determine a location of the tracking tag for each ping. In one example of step 508, tracking computer 140 processes receiver events 105 and generates locates 142, where each locate 142 defines a location of tag 106 within tracking area 102. In step 510, method 500 plots a symbol corresponding to each determined location on a graphical representation of the tracking area. In one example of step 510, plotter 252 and symbol generator 254 cooperate to generate symbols 260, 262, on display 256 corresponding to each locate 142.

In step 512, method 500 generates a vector on the graphical representation connecting each chronologically consecutive pair of determined locations. In one example of step 512, plotter 252 and vector generator 255 cooperate to generates lines 264 on display 256 between locations of chronologically adjacent locates 142. In step 514, method 500 identifies areas of the graphical display where the vectors indicate location errors. In one example of step 514, lines 264 on display 256 highlight errors in determined locations (locates 142), thereby identifying areas 270 within tracking area 102 where ping 108 is not optimally received by receivers 104. Since lines 264 are longer where the location error is greatest, an engineer or operator easily sees where the error is occurring.

Step 516 is a decision. If, in step 516, method 500 determines that optimization is required, method continues with step 518; otherwise, method 500 terminates.

In step 518, method 500 adjust configuration of the tracking system. In one example of step 518, alignment of one or more receivers 104 is adjusted (either manually and/or automatically) to improve reception of ping 108 from identified areas of tracking area 102. Steps 504 through 518 repeat to reevaluate tracking system 100 and further adjust if optimization is still necessary.

Figure 6:
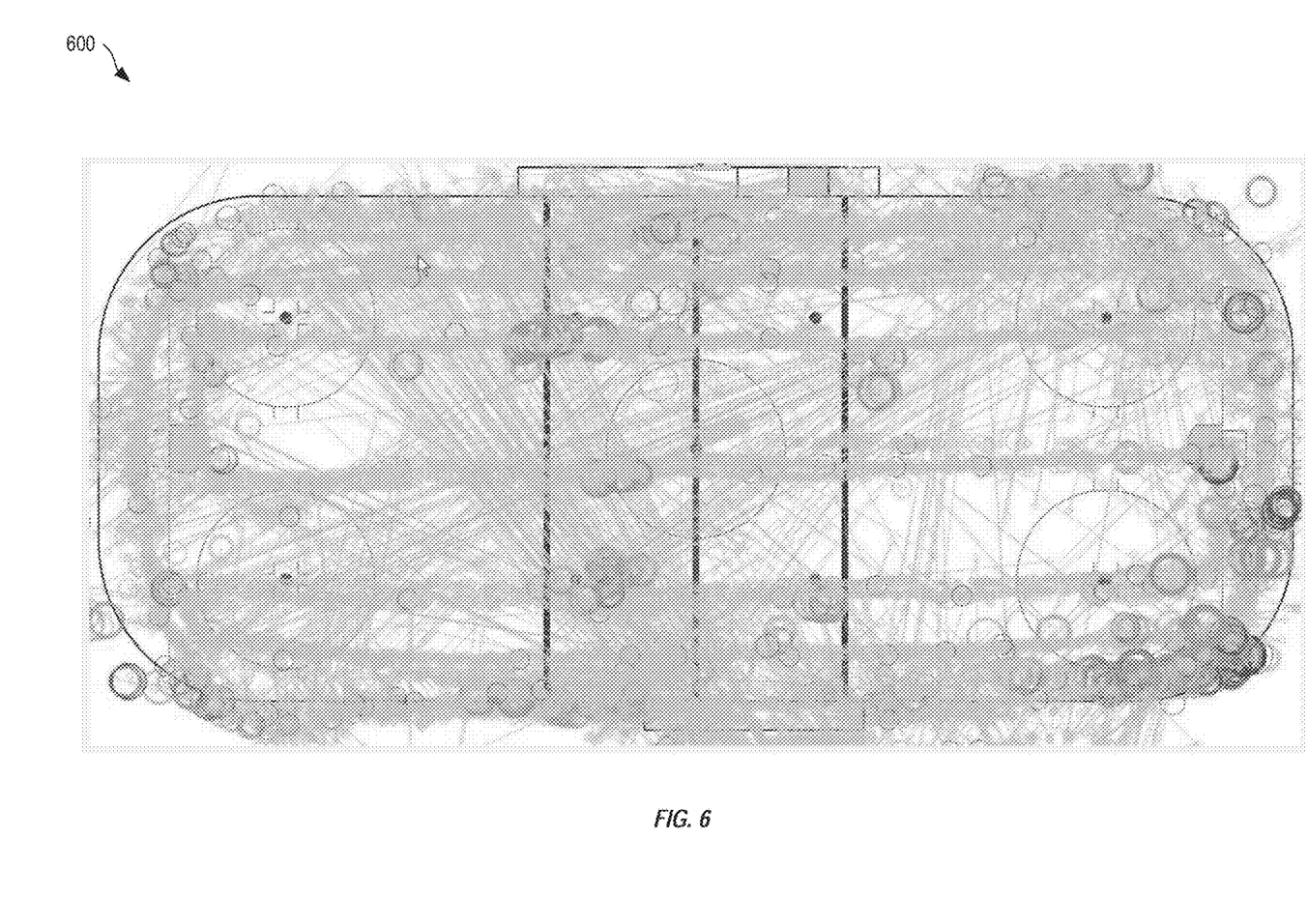
FIGS. 6, 7 and 8 show exemplary screen shots of the display of the optimization tool of FIG. 2, for an initial test, a subsequent test, and a final test, respectively, of tracking system configured at an ice rink.
Figure 7:
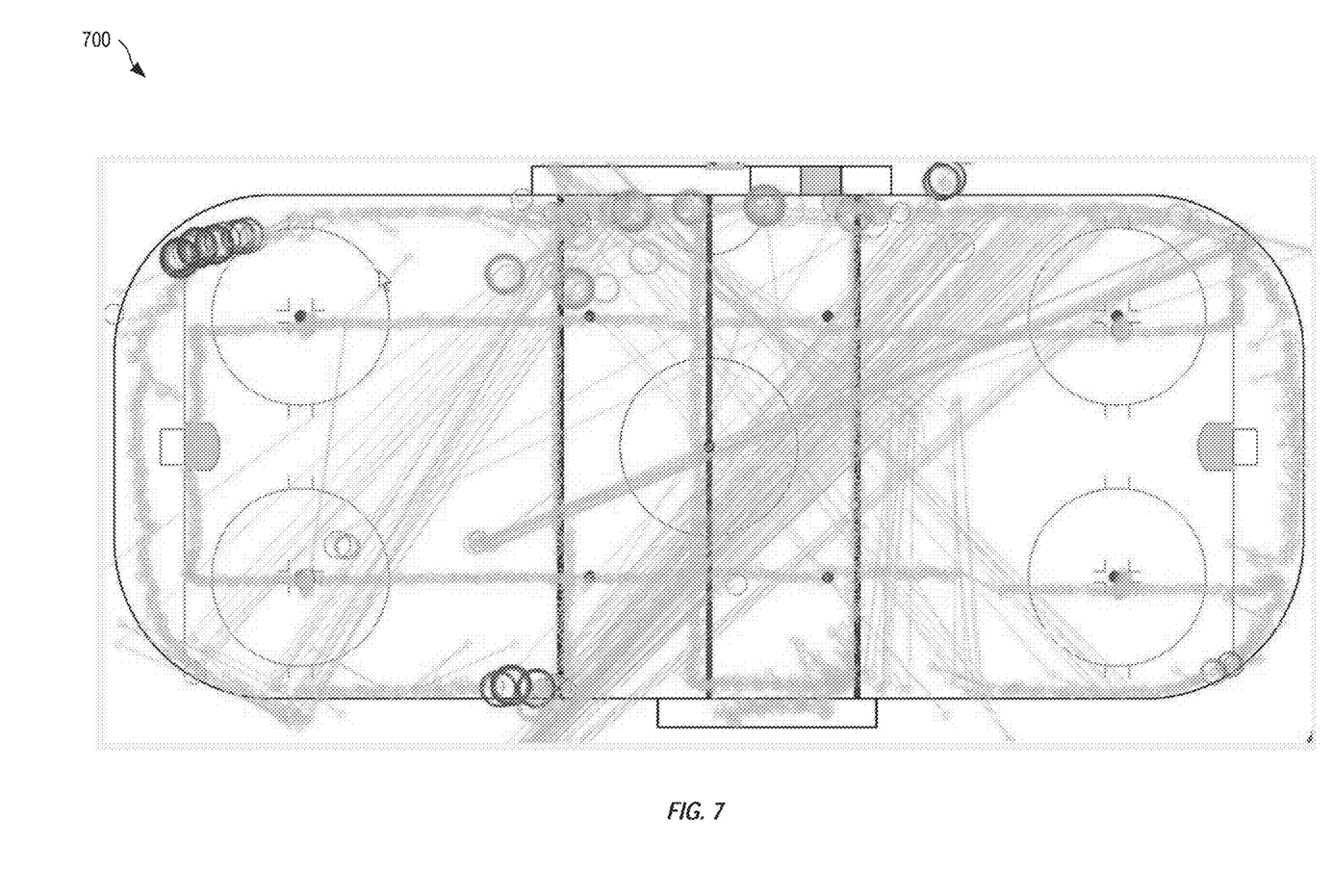
Figure 8:
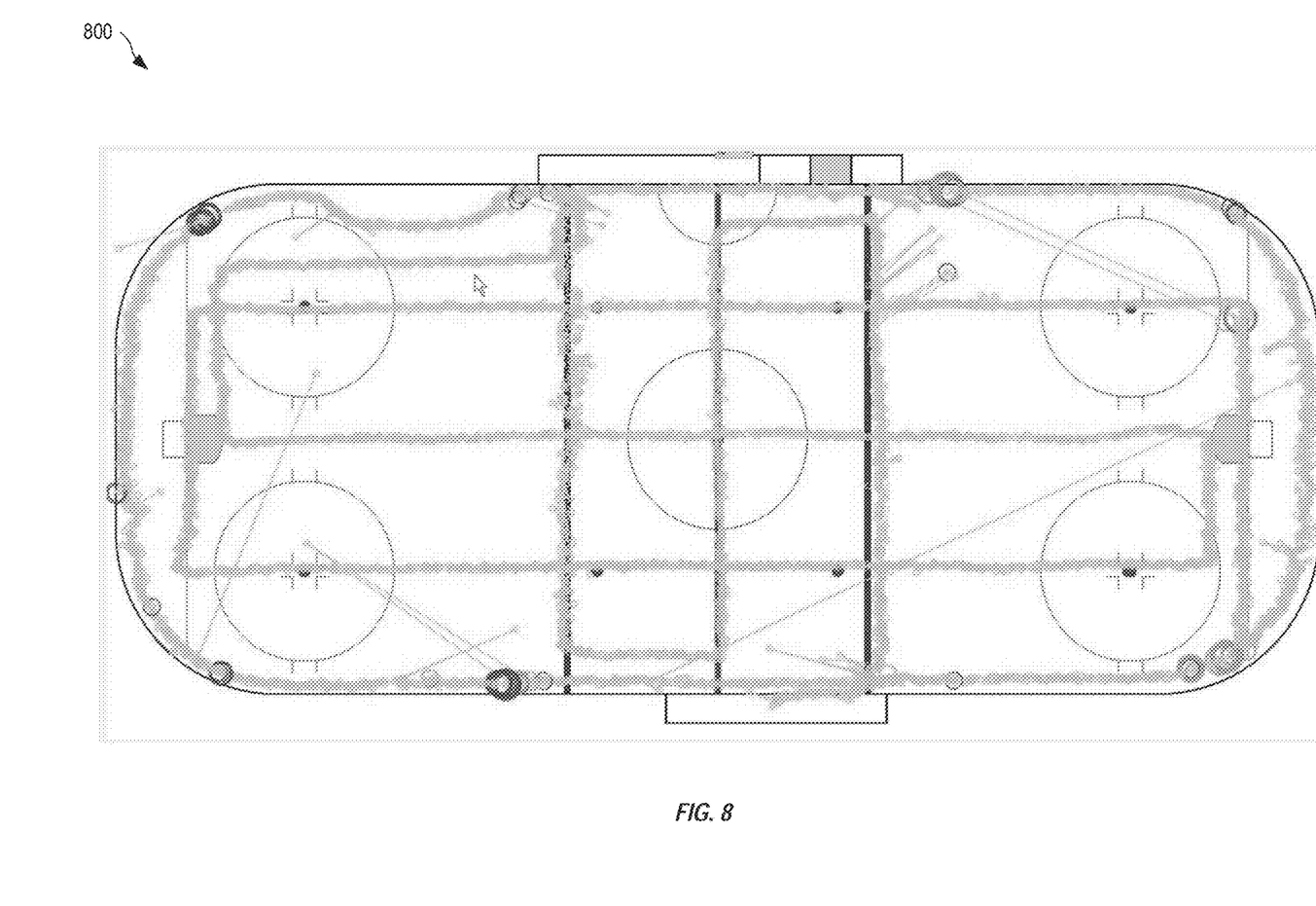

FIGS. 6, 7 and 8 show exemplary screen shots 600, 700, and 800, of display 256 of optimization tool 250 of FIG. 2, for an initial test, a subsequent test, and a final test, respectively, of tracking system 100 configured at an ice rink. As with the above examples, a single tracking tag was tracked as it moved systematically (e.g., over a predetermined pattern and at a constant speed) within the ice rink. Screen shot 600 shows severe degradation of tracking system 100 through reflection of the pings from the tracking tag. Upon analysis of screen shot 600, the system configuration was modified and the subsequent test made, resulting in screen shot 700. Although significant improvement was made to subsequent results from tracking system 100, lines generated by vector generator 255 indicate areas where reflections still occurred. Through analysis of these lines by the installation engineers, the configuration of tracking system 100 was further modified and then a further test performed, resulting in screen shot 800. As seen from screen shot 800, the number of tracking errors has been significantly reduced such that use of tracking system 100 is optimal.

Figure 9:
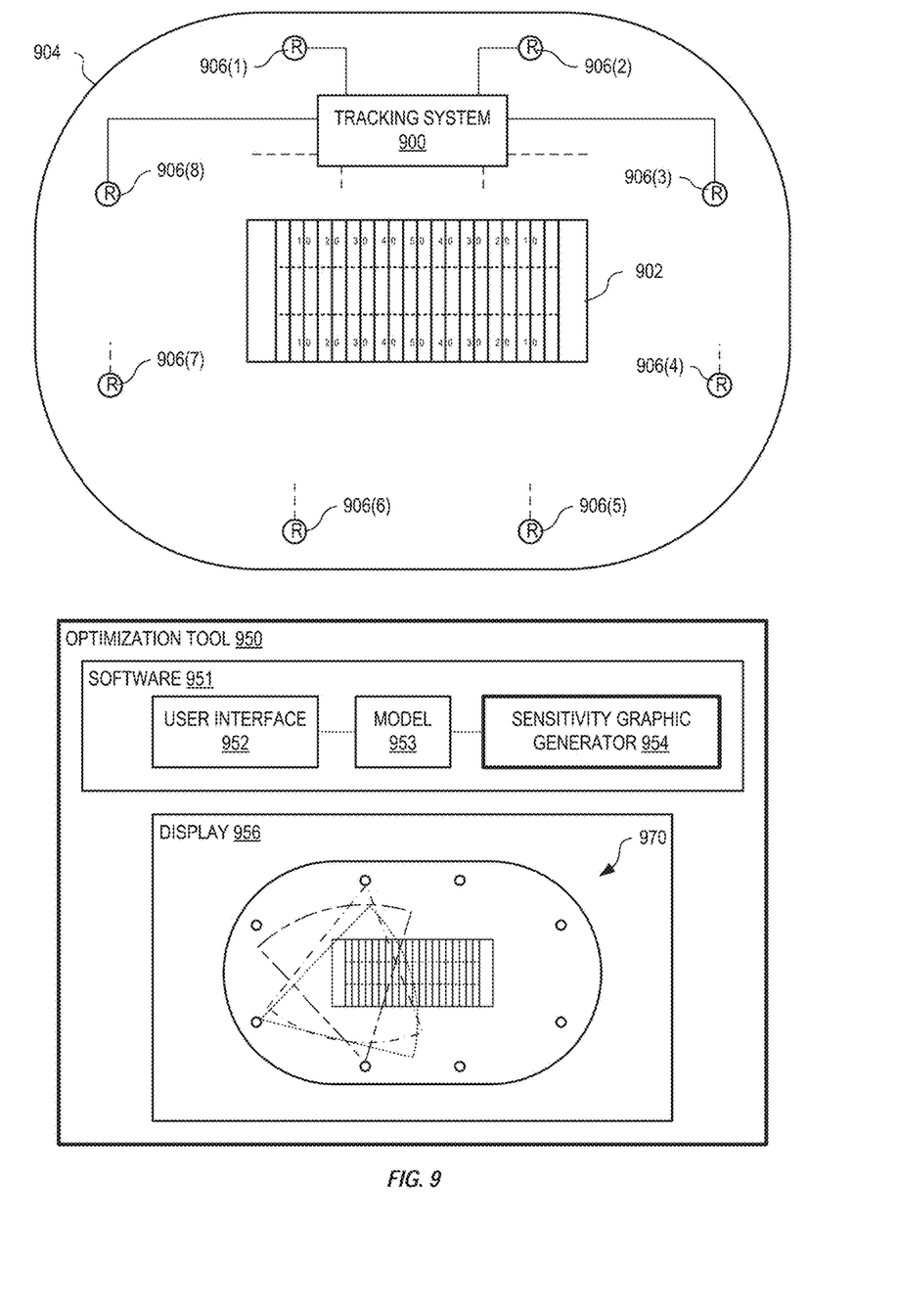
FIG. 9 shows one example tracking area within a surrounding area that is to be fitted with a tracking system that includes a plurality of receivers to be optimally positioned and aligned within surrounding area to track objects within tracking area.

FIG. 9 shows one example tracking area 902 (e.g., an American football field) within a surrounding area 904 (e.g., a stadium) that is to be fitted with a tracking system 900 that includes a plurality of receivers 906 to be optimally positioned and aligned within surrounding area 904 to track objects within tracking area 902. To facilitate positioning of receivers 906 within surrounding area 904, an optimization tool 950 generates a graphic representation 970 of receivers 906, surrounding area 904 and tracking area 902 on a display 956. Optimization tool 950 is a computer that includes software 951 that provides a user interface 952, a model 953, and a sensitivity graphic generator 954 that cooperate to generate graphic representation 970 to illustrate coverage of tracking area 902 by receivers 906. More particularly, user interface 952 allows a user to manipulate model 953 to change one or both of position and orientation of modelled receivers 906 with respect to tracking area 902. Sensitivity graphic generator 954 generates graphic representation 970 based upon model 953 to illustrate expected sensitivity of one or more of modelled receivers 906 with respect to modelled tracking area 902. Optimization tool 950 thereby allows the user (e.g., an installer of tracking system 900) to determine optimal position and/or orientation of receivers 906 within surrounding area 904 to provide optimal operation of tracking system 100.

Figure 10:
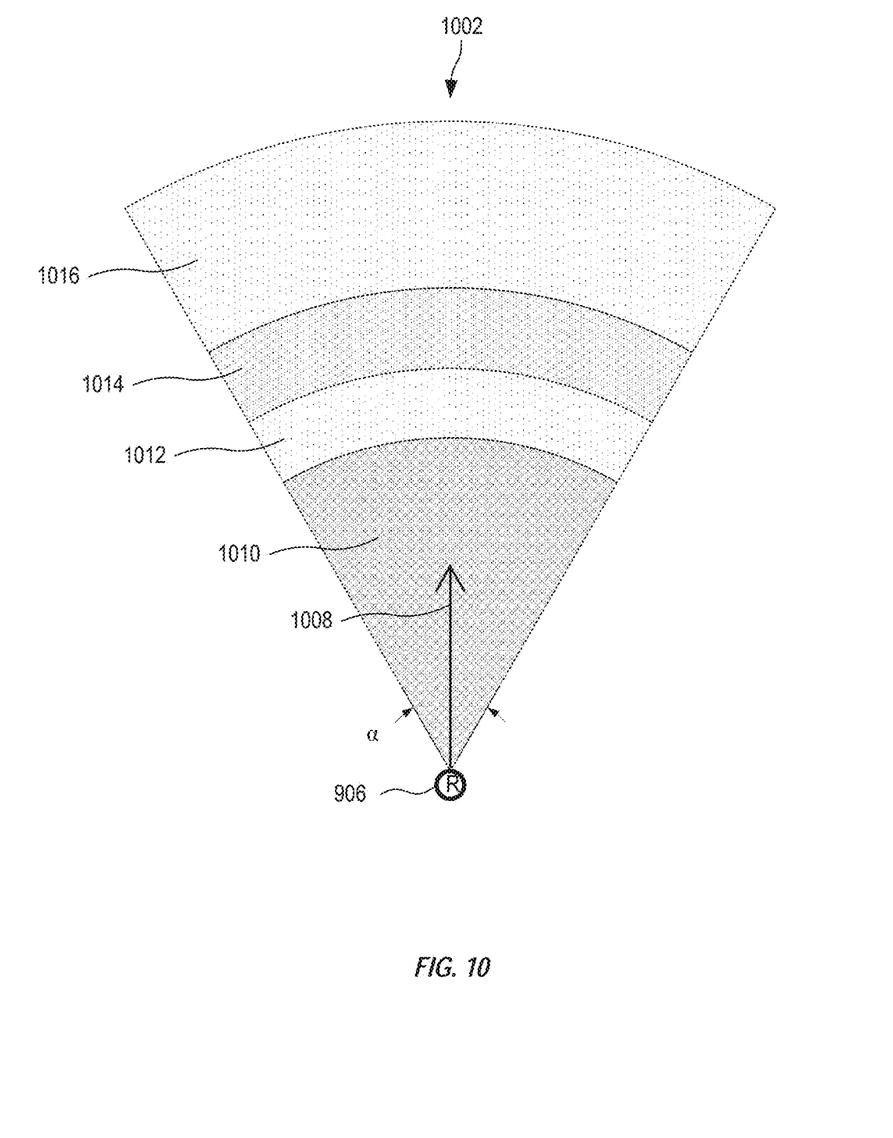
FIG. 10 is a plan view illustrating an example sensitivity area of one receiver of FIG. 9 to receiving transmissions (pings) from one or more tracking tags (not shown).

FIG. 10 is a plan view illustrating an example sensitivity area 1002 of one receiver 906 of FIG. 9 to receiving transmissions (pings) from one or more tracking tags (not shown). Such sensitivity is dependent upon an antenna used with receiver 906, an orientation (pan and tilt) of receiver 906, and an elevation of receiver 906 above tracking area 902. Receiver 906 is facing in a direction indicated by arrow 1002, and in this example, is configured with an antenna that receives signals within a sixty-degree wide reception area, where sensitivity decreases with distance from receiver 906.

Sensitivity of receiver 906 is determined by experimentation, measurement, and use of optimization tool 150 of FIG. 1, for example.

As shown in the example of FIG. 10, sensitivity of receiver 904 is generated as a sector 1010 that defines an area having a first sensitivity level, an annular sector 1012 adjacent to sector 1010 and defining an area having a second sensitivity level, an annular sector 1014 adjacent to sector 1012 and defining an area having a third sensitivity level, and an annular sector 1016 adjacent to sector 1014 and defining an area having a fourth sensitivity level. The first sensitivity level is the greatest (most sensitive), the fourth sensitivity level is the least sensitive, the third sensitivity level is between the first and the fourth sensitivity level. In general, for a constant signal strength of a transmission, the further location of the transmitter from receiver 906, the less the sensitivity of receiver 906 is to the transmission. However, in the case of annular segment 1012, the transmitted signal is cancelled out due to a ground effect, known in the art, such that the second sensitivity level is less that the third sensitivity level. This ground effect may be based upon elevation of receiver 906 above tracking area 902. Such variation in sensitivity of receiver 904 complicates configuration of a tracking system that uses receiver 906. In an alternate embodiment, the modeled receiver sensitivity is generated as a graduated representation where a density of the graduation indicates the modeled sensitivity of the receiver.

Figure 11:
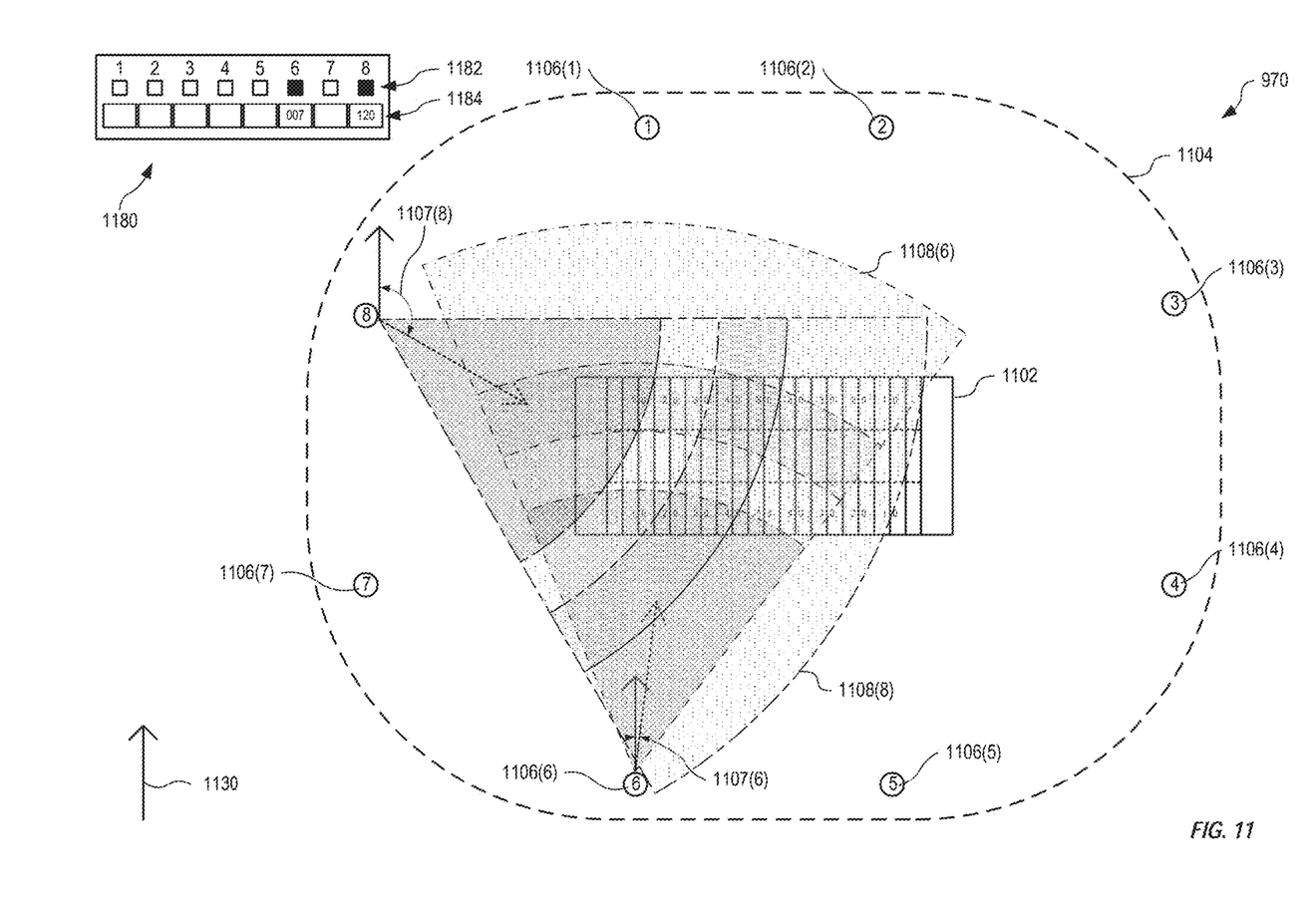
FIG. 11 is a schematic illustrating graphic representation of FIG. 9 in further detail.

FIG. 11 is a schematic illustrating graphic representation 970 of FIG. 9 in further detail. FIGS. 9, 10 and 11 are best viewed together with the following description.

For correct operation of tracking system 900, at least three, preferably four or more, receivers 906 are required to simultaneously receive a wireless transmission (ping) from a tracking tag attached to an object located within tracking area 902. Thus, receivers 906 are positioned and oriented such that their sensitivity areas 1102 overlap within tracking area 902. In the example of FIGS. 9, 10 and 11, each receiver 906 is assumed to have similar sensitivity areas 1002. However, where different receivers and/or antennae are used, model 953 may be adapted to model the appropriate sensitivity area without departing from the scope hereof. In certain embodiments of tracking system 900, one or more receivers 906 are configured with selectable antennae. Accordingly, model 953 may be adapted to selectively display multiple sensitivity areas for each receiver, thereby allowing the user to see the effect of each selectable antenna. In one embodiment, the sensitivity area of each receiver is displayed in a different color to allow the user to easily discerning the overlapping areas of the receiver sensitivities.

In the example of FIG. 11, the user has, through interaction with user interface 952 of optimization tool 950, enabled modelled sensitivity areas 1108(6) and 1108(8) of modelled receivers 1106(6) and 1106(8) to show expected overlap areas of ping reception of receivers 906(6) and 906(8), respectively. The user interactively, via user interface 952, adjusts one or both of angles 1107(6) and 1107(8) of modelled receivers 1106(6) and 1106(8), respectively, to position corresponding sensitivity areas 1108 relative to tracking area 1102 and to other sensitivity areas in real-time. Angles 1107 may be defined relative to a defined reference orientation (e.g., true north, magnetic north, a building orientation reference, and so on), such that when the user determines optimal angles 1107, corresponding receivers 906 may be correctly configured.

FIG. 11 also shows an interactive dialog 1180 of optimizing tool 950 that allows the user to interactively enable and disable display of modelled receivers 1106 using selectable toggles 1182, one per modelled receiver 1106, and define an orientation angle 1184 for each modelled receiver 1106. Other controls of optimizing tool 950 may be similarly implemented, such as for defining tracking area 1102, surrounding area 1104, and positioning of modelled receivers 1106 relative to modeled tracking area 102 and/or modelled surrounding area 1104.

Optimizing tool 950 facilitates installation of tracking system 900 to optimally track objects (e.g., players, balls, officials) configured with tracking tags when within tracking area 902.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. An optimization method that displays errors of a tracking system that utilizes a plurality of receivers positioned around a tracking area to receive pings periodically transmitted by a tracking tag within the tracking area, comprising:

receiving, from the tracking system, a plurality of locates in chronological order, each locate defining a location of the tracking tag calculated by the tracking system from one of the pings received by at least three of the receivers;

plotting, for each locate, a symbol on a display graphically depicting at least part of the tracking area, the symbol indicating the location relative to the tracking area; and plotting, on the display, a vector connecting first and second chronologically consecutive symbols, first and second ends of the vector connecting to the respective first and second symbols;

wherein the vector visually indicates an error within the locates that would otherwise not be visible on the display.

2. The optimization method of claim 1, the symbol having characteristics indicative of accuracy and quality of the corresponding locate, the characteristics being selected from the group including shape, size, and color.

3. The optimization method of claim 1, the vectors indicating areas within the tracking area from where the pings are not optimally received by the receivers.

4. The optimization method of claim 1, a length of each vector indicating a severity of the error.

5. A software product comprising instructions, stored on non-transitory computer-readable media, wherein the instructions, when executed by a computer, perform steps that display errors of a tracking system that has a plurality of receivers positioned around a tracking area to receive pings periodically transmitted by a tracking tag within the tracking area, comprising:

instructions for receiving, from the tracking system, a plurality of locates in chronological order, each locate defining a location of the tracking tag calculated by the tracking system from one of the pings received by at least three of the receivers;

instructions for plotting, for each locate, a symbol on a display graphically depicting the tracking area, the symbol indicating the location relative to the tracking area; and instructions for plotting, on the display, a vector connecting first and second chronologically consecutive symbols, first and second ends of the vector connecting to the respective first and second symbols, the vector visually indicating an error within the locates that would otherwise not be visible on the display.

6. The software product of claim 5, the instructions for plotting the symbol comprising instructions for generating the symbol with characteristics indicative of accuracy and quality of the corresponding locate, the characteristics being selected from the group including shape, size, and color.

7. The software product of claim 5, the vectors indicating areas within the tracking area from where the pings are not optimally received by the receivers.

8. The software product of claim 5, the instructions for plotting the vector comprising instructions for plotting each vector with a length indicating a severity of the error.

9. A method that concurrently displays predicted receiver coverage of a tracking system that uses at least three receivers to locate tracking tags within a tracking area, the at least three receivers being positioned within a surrounding area of the tracking area to receive pings transmitted from the tracking tags, comprising:

generating a graphical representation of the surrounding area and the tracking area on a display;

interactively receiving (a) a position of each of the receivers relative to the tracking area, and (b) an orientation of each of the receivers relative to a reference direction;

modeling each of the receivers to determine a modeled sensitivity of said each of the receivers to the pings based upon the position and the orientation of said each of the receivers; and generating a graphical representation of each modeled sensitivity on the display relative to the graphical representation of the surrounding area and the tracking area;

wherein the graphical representation of each modeled sensitivity and the graphical representation of the surrounding area and the tracking area indicate the predicted receiver coverage of the tracking area.

10. The method of claim 9, wherein modeling includes modeling a ground effect to determine the modeled sensitivity of said each of the receivers.

11. The method of claim 9, wherein generating the graphical representation of each modeled sensitivity includes generating the graphical representation of each modeled sensitivity as a sector and at least one annular sector, wherein each of the sector and the at least one annular sector indicates a level of the modeled sensitivity.

12. The method of claim 9, wherein generating the graphical representation of each modeled sensitivity includes generating the graphical representation of each modeled sensitivity as a graduated representation, a density of the graduation indicating a level of the modeled sensitivity.

13. The method of claim 9, wherein the graphical representation of each modeled sensitivity is generated in a different color.

14. The method of claim 9, further comprising:

interactively receiving changes to one or both of the position and orientation of one of the receivers; and updating the display in real-time by repeating the steps of modeling and generating the graphical representation of each modeled sensitivity on the display.

\* \* \* \* \*